(12) United States Patent
Liebenow

(10) Patent No.: US 6,789,067 B1
(45) Date of Patent: Sep. 7, 2004

(54) MULTIPLE RECIPE MERGE WITH FEEDBACK

(75) Inventor: Frank Liebenow, Dakota Dunes, SD (US)

(73) Assignee: Gateway, Inc., Poway, CA (US)

(*) Notice: Subject to any disclaimer, the term of this patent is extended or adjusted under 35 U.S.C. 154(b) by 509 days.

(21) Appl. No.: 09/740,428

(22) Filed: Dec. 19, 2000

(51) Int. Cl.[7] ............................................. G06F 17/60
(52) U.S. Cl. ............................. 705/15; 705/28; 705/32
(58) Field of Search ............................. 705/15, 28, 30, 705/32, 29; 707/3, 7

(56) References Cited

U.S. PATENT DOCUMENTS

| | | | | |
|---|---|---|---|---|
| 4,807,169 A | * | 2/1989 | Overbeck | 708/200 |
| 4,872,112 A | * | 10/1989 | Hungerford | 700/90 |
| 5,877,477 A | * | 3/1999 | Petty et al. | 219/506 |
| 5,960,440 A | * | 9/1999 | Brenner et al. | 707/104.1 |
| 6,064,050 A | | 5/2000 | Ishikawa et al. | 219/720 |
| 6,381,614 B1 | * | 4/2002 | Barnett et al. | 707/104.1 |
| 6,490,527 B1 | * | 12/2002 | Utt | 702/9 |

FOREIGN PATENT DOCUMENTS

GB 2141565 A * 12/1984

OTHER PUBLICATIONS

MasterCook Publication. 1995 Sierra On-line, Inc. Chapters 4 and 5.*
Microsoft Project 2000 for Windows, Product Enhancements Guide; Oct. 1999.

* cited by examiner

Primary Examiner—James S. McClellan
(74) Attorney, Agent, or Firm—Scott Charles Richardson; Frank Liebenow

(57) ABSTRACT

An electronic recipe manager capable of merging two or more electronic recipes into a task list that can be executed to prepare a multiple dishes or food items of a complete a meal is described. Electronic recipes for preparing one or more food items are retrieved wherein each recipe includes at least one task. The recipes are then merged by combining the task(s) of each recipe to provide a task list suitable for use in preparing the food items, wherein the tasks are arranged chronologically so that the food items are completed and made ready to serve at substantially the same time. In exemplary embodiments, merging of the recipes may be accomplished by interrogating a database associating each task within the recipes with a time requirement describing the estimated time required for performing the task. When a task is performed, the actual time required for performing the task may be determined and used for updating the time requirement associated with the task.

9 Claims, 7 Drawing Sheets

MULTIPLE RECIPE MERGE WITH FEEDBACK

FIELD OF THE INVENTION

The present invention generally relates to systems and methods for aiding cooks in the preparation of food, and more particularly to an electronic recipe manager capable of merging electronic recipes so that the food preparation tasks of the electronic recipes are ordered so that the food items are completed and made ready to serve at substantially the same time.

BACKGROUND OF THE INVENTION

As information appliances such as personal computers, Internet appliances and the like become more pervasive throughout the home, the use of such appliances in everyday tasks such as food preparation will become more commonplace. For instance, information appliances are often used as a storehouse for "electronic" recipes used in the preparation of meals by both amateur and professional cooks. Such electronic recipes typically not only include the ingredients required for preparing the dish, but also list the tasks or steps to be performed by the cook or cooks to combine the ingredients to complete the recipe. For example, an electronic recipe for baking a potato may include the following tasks:

Turn oven on and set temperature to 450 Degrees
Allow oven to preheat for 15 minutes
Wash potato
Wrap potato in aluminum foil
Place potato in oven
Bake potato for 45 minutes
Remove potato from oven Such electronic recipes are easily followed when only one dish is being prepared. However, when several dishes are being prepared at once, for example a main course and several side dishes for a meal, it is often difficult for cooks to juggle the tasks required to prepare each so that the dishes are completed, and ready to serve, at approximately the same time. As a result, one or more of the dishes may be completed too soon, and may become cold or stale prior to being served. Further, it may also be difficult to schedule the simultaneous use of key resources, e.g., cooks, the stove burners, a microwave, a cutting board, and the like, needed for preparing the dishes.

Consequently, it would be advantageous to provide a system and method for preparing two or more dishes or food items wherein the food preparation tasks are ordered so that the food items are ready to serve at substantially the same time.

SUMMARY OF THE INVENTION

Accordingly, the present invention is directed to an electronic recipe manager for merging electronic recipes wherein the food preparation tasks of the electronic recipes are ordered so that the food items are completed and made ready to serve at substantially the same time.

In accordance with a first aspect of the present invention, the electronic recipe manager implements a method for merging electronic recipes so that the food preparation tasks of the electronic recipes are ordered so that the food items are completed and made ready to serve at substantially the same time is described. In an exemplary embodiment, the method includes retrieving electronic recipes for preparing one or more food items wherein each recipe includes at least one task. The recipes are then merged by combining the task(s) of each recipe to provide a task list suitable for use in preparing the food items, wherein the tasks are arranged chronologically so that the food items are ready to serve at substantially the same time. In exemplary embodiments, merging of the recipes may be accomplished by interrogating a database associating each task within the recipes with a time requirement describing the estimated time required for performing the task. When a task is performed, the actual time taken to complete the task may be determined and used for updating the time requirement associated with the task.

In accordance with a second aspect of the present invention, a system employing an electronic recipe manager for merging electronic recipes wherein the food preparation tasks of the electronic recipes are ordered so that the food items are completed and made ready to serve at substantially the same time is disclosed. The system includes a control appliance capable of retrieving electronic recipes for preparing one or more food items wherein each recipe includes at least one task. The control appliance merges the recipes by combining the task(s) of each recipe to provide a task list suitable for use in preparing the food items, wherein the tasks are arranged chronologically so that the food items are ready to serve at substantially the same time. In exemplary embodiments, the control appliance may include a database for associating each task within the recipes with a time requirement describing the estimated time required for performing the task. When a task is performed, the actual time required for performing the task may be determined and used for updating the time requirement associated with the task.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The present invention provides an electronic recipe manager capable of merging two or more electronic recipes into a task list that can be executed to prepare a multiple dishes or food items of a complete meal. The system and method allow the task(s) of the electronic recipes to be ordered chronologically, so that the food items are ready to serve at substantially the same time. Reference will now be made in detail to the presently preferred embodiments of the invention, examples of which are illustrated in the accompanying drawings.

Figure 1:
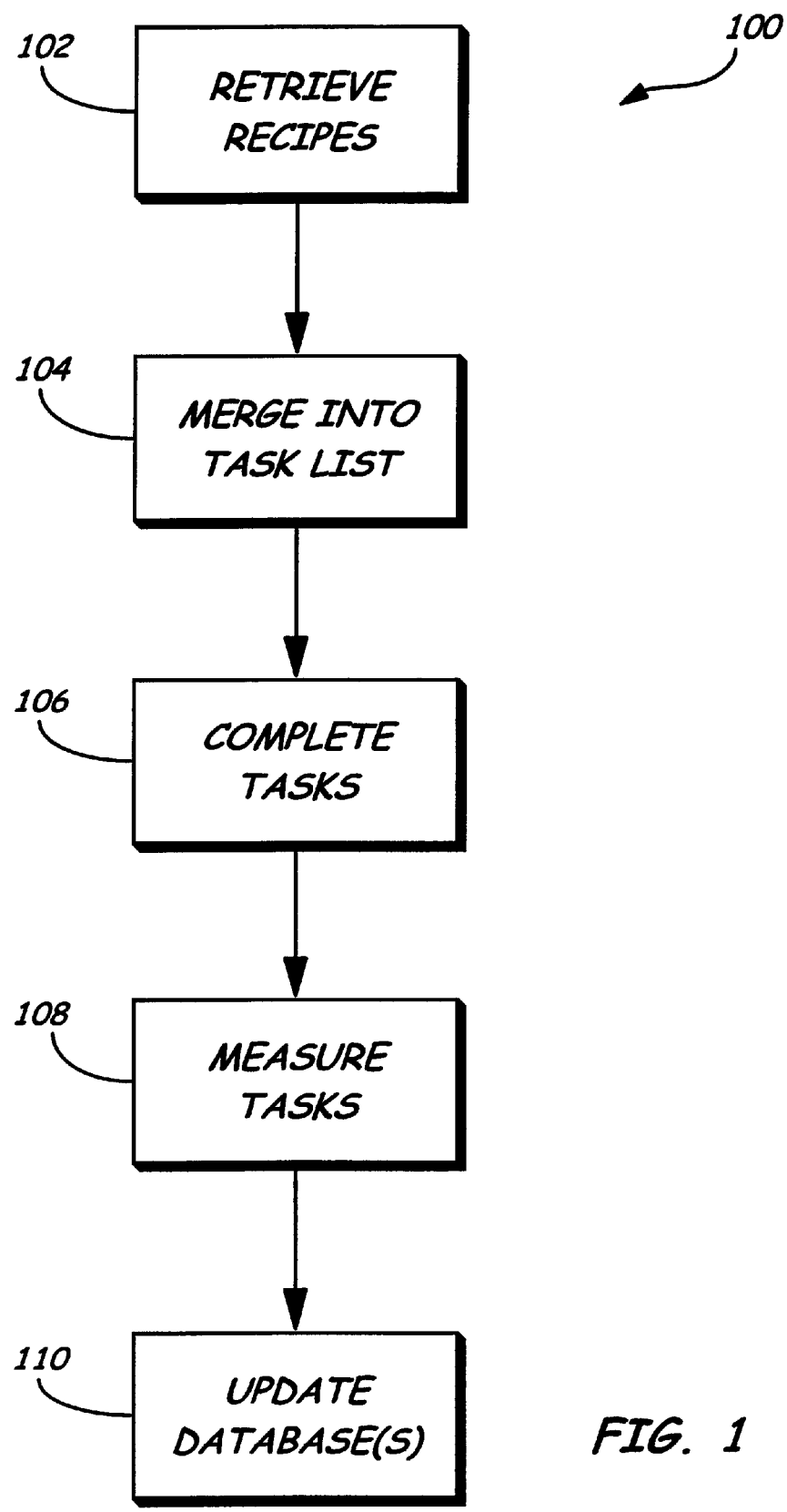
FIG. 1 is a flow diagram illustrating a method of merging recipes in accordance with an exemplary embodiment of the present invention.

Referring now to FIG. 1, an exemplary method 100 for merging electronic recipes so that the food preparation tasks of the electronic recipes are ordered so that the food items are completed and made ready to serve at substantially the same time is described. The method is initiated by the user activating the electronic recipe manager, at step 102, wherein the electronic recipe manager may retrieve one or more electronic recipes from a database of electronic recipes. It is understood that the recipes may be located in external databases, such as an Internet recipe website. Each recipe retrieved includes one or more tasks describing a step or steps for preparing the desired food item. Preferably, at least one time requirement is associated with each task within the various recipes describing the estimated time required to complete the task for an average cook, or alternately for a specifically named cook. Similarly, at least one resource requirement may be associated with each task. Each resource requirement preferably describes the resources required to complete a specific task. Such resources may include, the cooks, appliances, dishes and utensils required for completion of the task. The recipes are next merged, at step 104, by combining the task(s) of each recipe retrieved at step 102 to provide a task list suitable for use in preparing the desired food items. Preferably, the time requirements and resource requirements associated with each task are used to order the tasks chronologically so that the food items may be completed and made ready to serve at substantially the same time.

Figure 2:
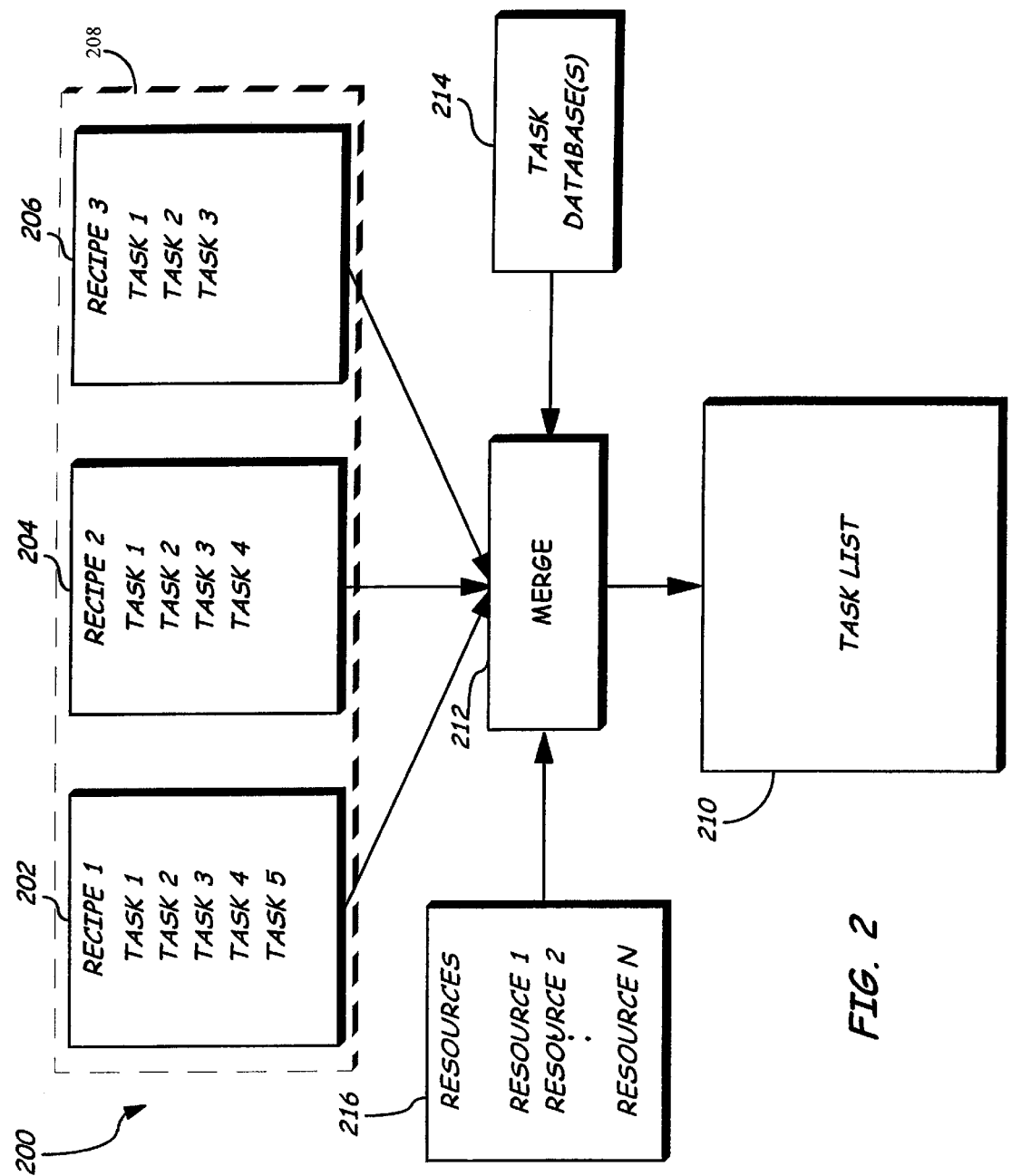
FIG. 2 is a block diagram illustrating merging of utilizing an exemplary embodiment of the method shown in FIG. 1.

In the embodiment of the invention 200, shown in FIG. 2, multiple recipes, e.g., "RECIPE 1" 202, "RECIPE 2" 204 and "RECIPE 3" 206, may be retrieved from a database of recipes 208. The various tasks of these recipes are identified and merged together into a single task list 210 by merge routine 212. In merging the recipes 202, 204 & 206, the merge routine 212 may interrogate one or more task databases 214 capable of associating each task of recipes 202, 204 & 206 with the time and, optionally, the resource requirements for performing those tasks. The merge routine 212 may further interrogate one or more resource databases 216 capable of maintaining the availability of resources required for performing the various tasks of the task list 210. For example, in one embodiment, "RECIPE 1" 202 of FIG. 2 may, for example, be a recipe for baking a potato, while "RECIPE 2" 204 is a recipe for grilling a steak, and "RECIPE 3" 206 is a recipe for cooking carrots. In such an embodiment, "RECIPE 1" 202 may include the following tasks:

Task 1: Turn oven on and set temperature to 450 Degrees
Task 2: Allow oven to preheat for 15 minutes
Task 3: Place potato in oven
Task 4: Bake potato for 45 minutes
Task 5: Remove potato from oven while "RECIPE 2" 204 includes the tasks:

Task 1: Season steak with salt, pepper, and garlic salt
Task 2: Place steak on grill for 4 minutes (medium rare)
Task 3: Flip steak and let grill for 4 minutes
Task 3: Remove steak from grill and "RECIPE 3" 206 includes the tasks Task 1: Wash and cut four carrots
Task 2: Place carrots in microwave safe dish
Task 3: Microwave carrots for 3 minutes.
Task 4: Remove carrots from microwave Thus, a task list, such as task list 300 of FIG. 3, combining these recipes may thus arrange the tasks in the following order:

Recipe 1, Task 1: Turn oven on and set temperature to 450 Degrees
Recipe 1, Task 2: Allow oven to preheat for 15 minutes
Recipe 3, Task 1: Wash and cut four carrots
Recipe 3, Task 2: Place carrots in microwave safe dish
Recipe 1, Task 3: Place potato in oven
Recipe 1, Task 4: Bake potato for 45 minutes
Recipe 2, Task 1: Season steak with salt, pepper, and garlic salt
Recipe 2, Task 2: Place steak on grill for 4 minutes (medium rare)
Recipe 2, Task 3: Flip steak and let grill for 4 minutes
Recipe 3, Task 3: Microwave carrots for 3 minutes.
Recipe 1, Task 5: Remove potato from oven
Recipe 3, Task 4: Remove carrots from microwave
Recipe 2, Task 3: Remove steak from grill. Each task may further be assigned to a specific cook or cooks and resources that are required for performing the task (e.g., utensils, appliances, and the like) reserved so that the task may be performed according to order and/or schedule specified by the task list (see FIG. 3).

In FIG. 2, the electronic recipe manager of the present invention is shown as being implemented using multiple databases (i.e., a recipe database 208 containing recipes, a task database 214 associating tasks of the recipes with time and resource requirements for performing those tasks, and a resource database 216 providing the availability of required resources). However, it will be appreciated that the present invention may alternately use other database structures for storing and retrieving the required information. For example, the present invention may utilize a single database storing recipes and associating tasks of the recipes with the time and resource requirements required to perform those tasks. Such a database may further maintain the availability of required resources. Consequently, modification of the presently disclosed method and system to use a single database, or alternately to use combinations of databases other than that specifically disclosed herein to provide the required information is contemplated and would not depart from the scope and spirit of the present invention. In addition, the resource and task databases may be optional and may or may not be present in various combinations. Another advantage of this invention is to provide a better estimate of the time of completion.

Figure 3:
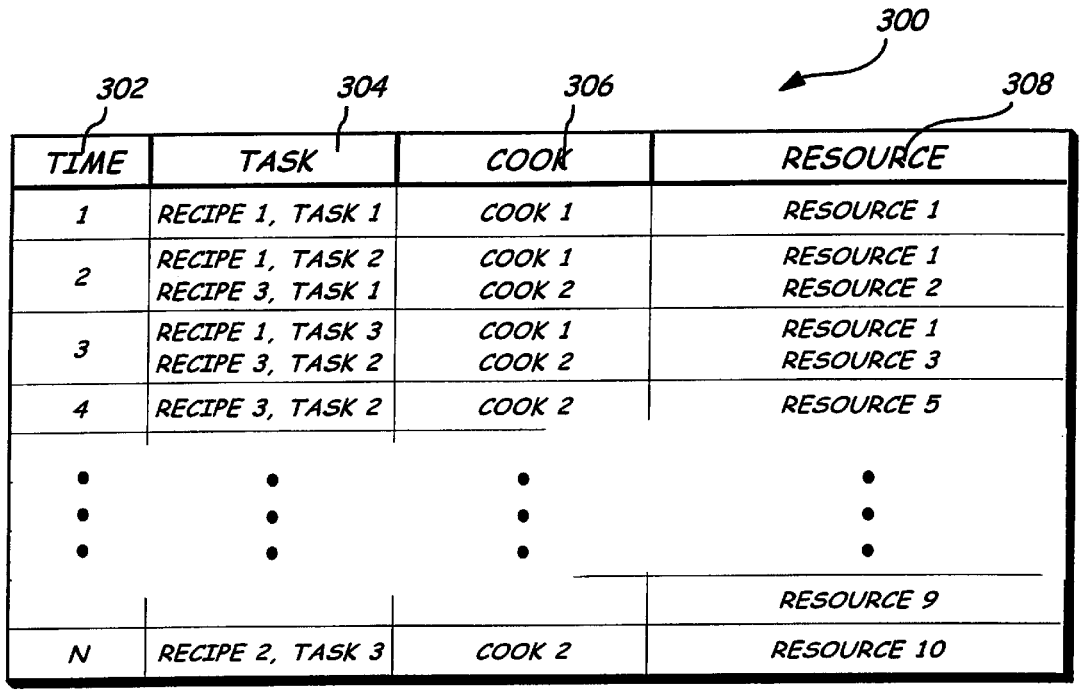
FIG. 3 is a table further illustrating an exemplary task list, such as the task list shown in FIG. 2, wherein tasks of two or more recipes are merged together.

Referring now to FIG. 3, an exemplary task list, such as the task list 210 shown in FIG. 2, is described. In an exemplary embodiment, the task list 300 may be comprised of one or more time slots 302 to which tasks 304 from the various merged recipes are assigned allowing the tasks 304 to be ordered and scheduled so that the food items may be completed and made ready to serve at substantially the same time. In an alternative embodiment, the time slots may indicate "time to finish", such that 1:05 indicates that an hour and five minutes remain until the merged recipe is completed. Likewise, each time slot 302 may optionally be allocated a cook or group of cooks 306 and set of resources 308 for completion of the task or tasks associated with that time slot 302. In this manner, each task 302 may be assigned to a particular cook or cooks 306 and may be allocated a set of resources 308 to more evenly allocate tasks to cooks and to prevent resource conflicts.

In exemplary embodiments of the invention, time slots 302 of task list 300 may each have a fixed duration (e.g., 10 minutes, 15 minutes, a duration designated by users of the system, or the like). A task or tasks 304 assigned to a particular time slot 302 are begun during that time slot 302. In this manner, the present invention may allow tasks 302 to be scheduled for start and completion at a particular time so that the food items being prepared may be completed according to a desired schedule (e.g., in time for a dinner scheduled at 7:00 p.m.). In an alternative embodiment, before the merge is started, the user may specify when dinner is to be served and the TIME column can indicates the actual time the task should be started.

Preferably, the task or tasks 304 may be scheduled to be completed during the time slot 302 in which they are begun, provided the task or tasks are capable of being performed within the duration of one time slot 302 based on the estimated time required for performing the task retrieved from the task database. Alternately, the task or tasks 304 may be scheduled to be performed over the period of time representing two or more time slots 302. If necessary, the cook or cooks 306 and resources 308 allocated for completion of tasks or tasks 304 requiring two or more time slots 302 for completion may be reserved for the additional time slots 302. For instance, a particular cook, for example "COOK 1" 306, may be assigned the task ("RECIPE 1, TASK 1") 304 requiring two time slots ("1" and "2") 302, each having a 10 minute duration, and requiring resources ("RESOURCE 1") 308. Wherein the task 304 would require the services of the assigned cook ("COOK 1") 306 and/or resources ("RESOURCE 1") 308 during the entire 20 minute duration of the two time slots 302, the cook(s) 306 and resource(s) 308 would not be scheduled for performing another task until at least the third time slot, e.g., time slot "3", allowing time for the first task to be completed. Alternately, a task 302 may require two or more time slots 302 for completion but may not require a cook 306 or resources 308 during each of the time slots 302. For example, a particular cook, for example "COOK 2", 306 may be assigned a task ("RECIPE 3, TASK 2") 304, e.g., placing a potato in an oven to bake, wherein completion of the task would require six time slots 302, each having a 10 minute duration. However, in this case, the cook ("COOK 2") would be free to perform other tasks while the first task is completed (i.e., while the potato bakes). Thus, the cook ("COOK 2") 306 may be assigned other tasks either during the same or succeeding time slots 302 even though the original task 304 (i.e., baking the potato) is not complete.

It will be appreciated that due to reasons such as inefficiency of the assigned cook or cooks, or the like, a scheduled task may not be completed in the allocated time. Consequently, the start and completion of succeeding tasks may be delayed. In exemplary embodiments, the present invention may allow for such delays by continuously rescheduling the tasks yet to be performed within the task list based on the actual completion times of tasks already performed.

The present invention may also allow the time requirement associated with performing tasks to be updated based on actual experience. Referring again to FIG. 1, as the tasks are completed, at step 106, the actual time required to perform the tasks may be measured or determined at step 108 and used for updating the time requirement associated with the task at step 108, for example by updating the task database 214 shown in FIG. 2. For example, time measurements may be taken by placing the system implementing the present invention in a "learning mode" wherein the times required for performing tasks are recorded and averaged. Once all desired actual times for performing tasks are determined or measured, the system may revert to a "normal" mode wherein times are no longer recorded. Alternately, the time required for a cook to perform a given task may be recorded each time that task is performed. Further, each cook may be queried to provide the time he or she believes will be taken to perform tasks within the task database. In this manner, a feedback loop may be provided to ensure that times requirements associated with tasks in the task database are representative of how long the task will take.

In exemplary embodiments of the invention, this may be accomplished by first identifying the cook performing the task. When a task of a recipe is completed, the actual time required to complete the task is recorded and associated with the identity of the cook. This time may then be used to generate a more accurate time requirement for that cook for performing the task (e.g., by averaging several measurements of the time required by the identified cook to perform the task taken over a period of time) that may thereafter be used for arranging the task in the task list when that cook is to perform the task.

Figure 4A:
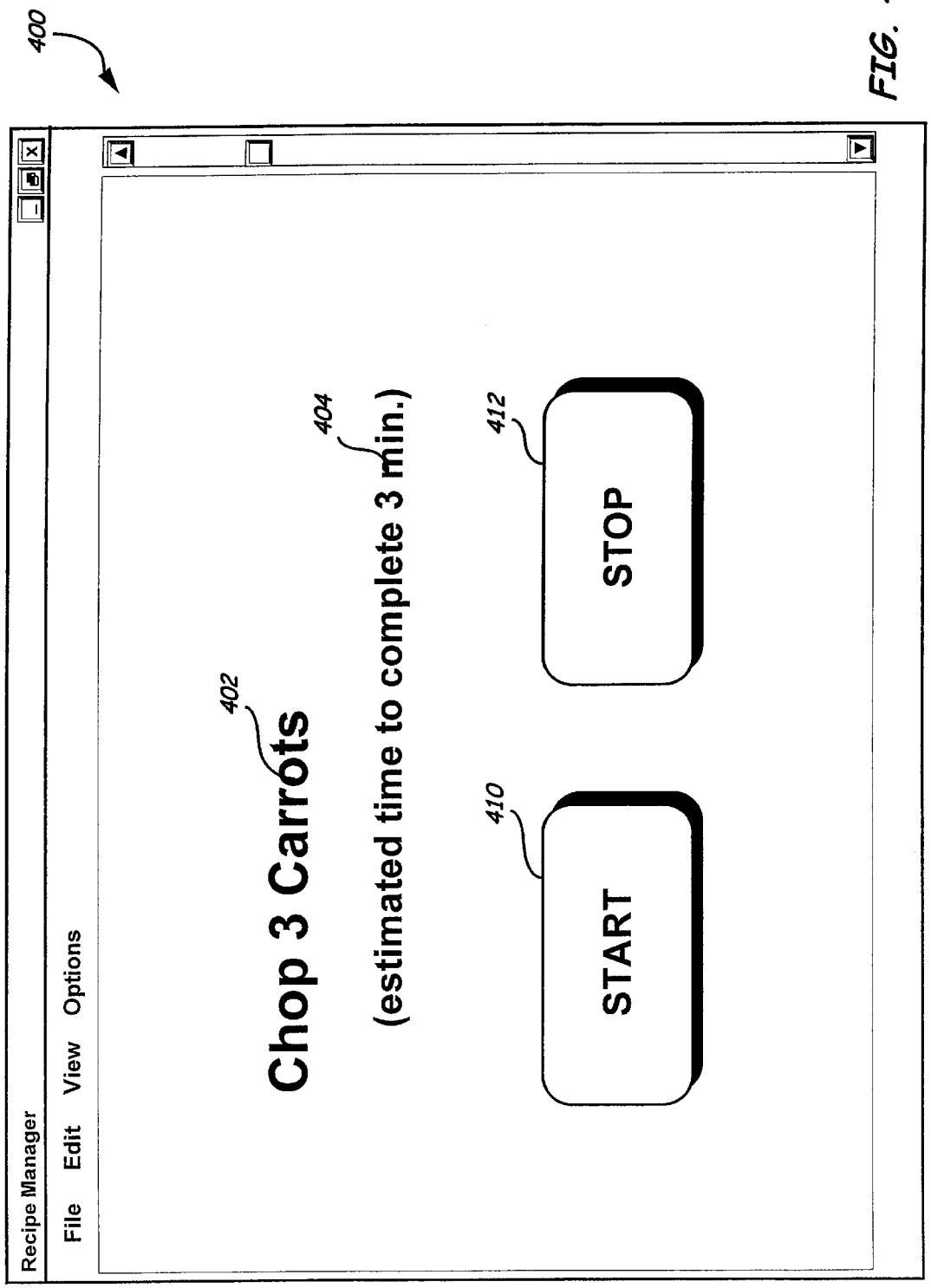
FIGS. 4A and 4B illustrate exemplary command screens usable for receiving feedback from users of the present invention.
Figure 4B:
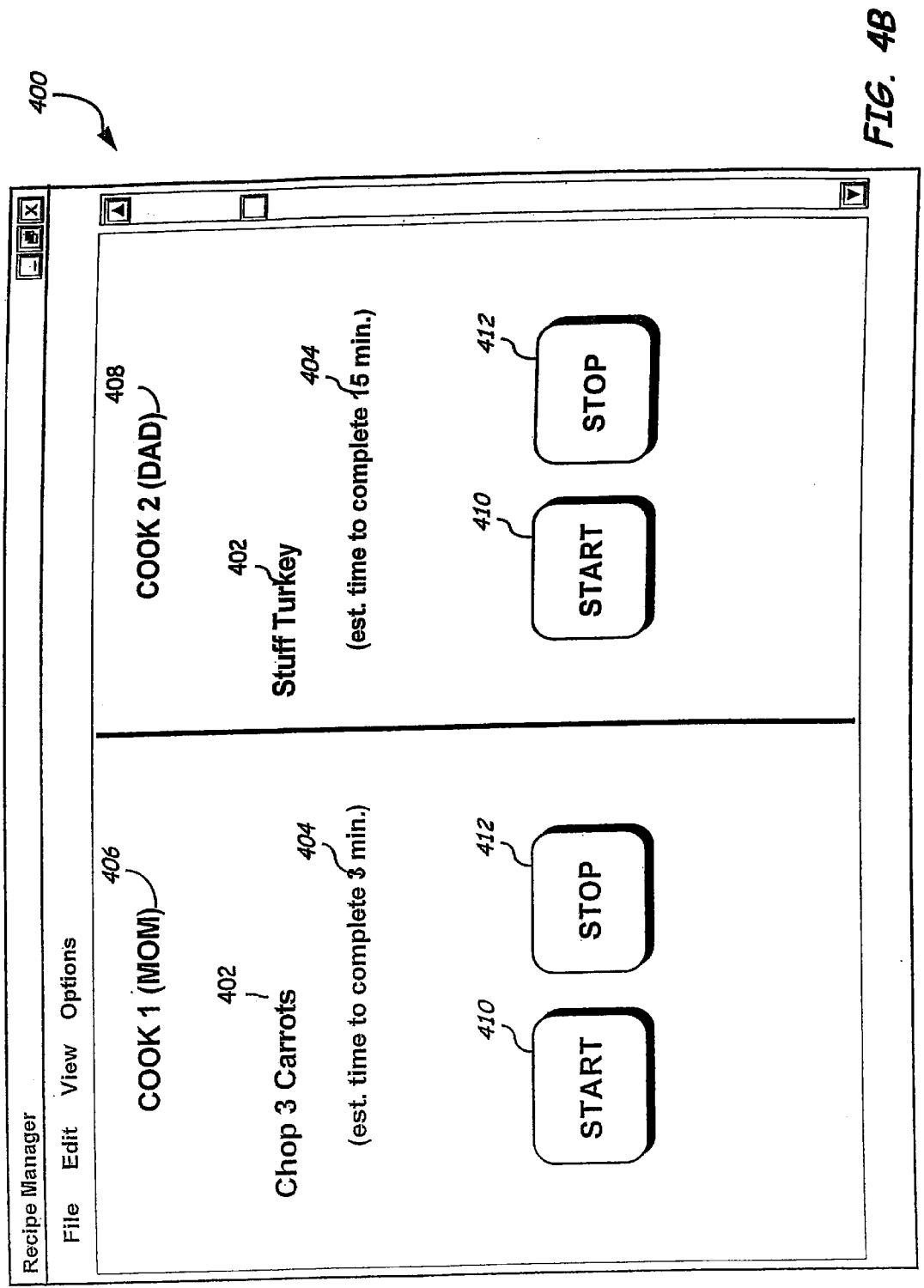

For example, in one embodiment shown in FIGS. 4A and 4B, a system implementing the present invention (e.g., system 600 shown in FIG. 6) may include a user interface such as display 400 suitable for providing instructions 402 to one or more cooks for performing a task or tasks of the task list. This display 400 may further provide the estimated time 404 required for performing the task for which instructions 402 are displayed and may identify the cook (e.g., "MOM" 406 or "DAD" 408) performing the task. When the task is begun, the cook performing the task may select a control such as "START" button 410 to indicate that performance of the task is started. The system may then start a timer for recording the time necessary to perform the indicated task. When the cook completes the task, he or she may select a control, such as "STOP" button 412 which stops the timer and records the time required by the cook for completing the task. This time may then be used to update a task database providing measured time requirement for that cook for performing the task.

Figure 5:
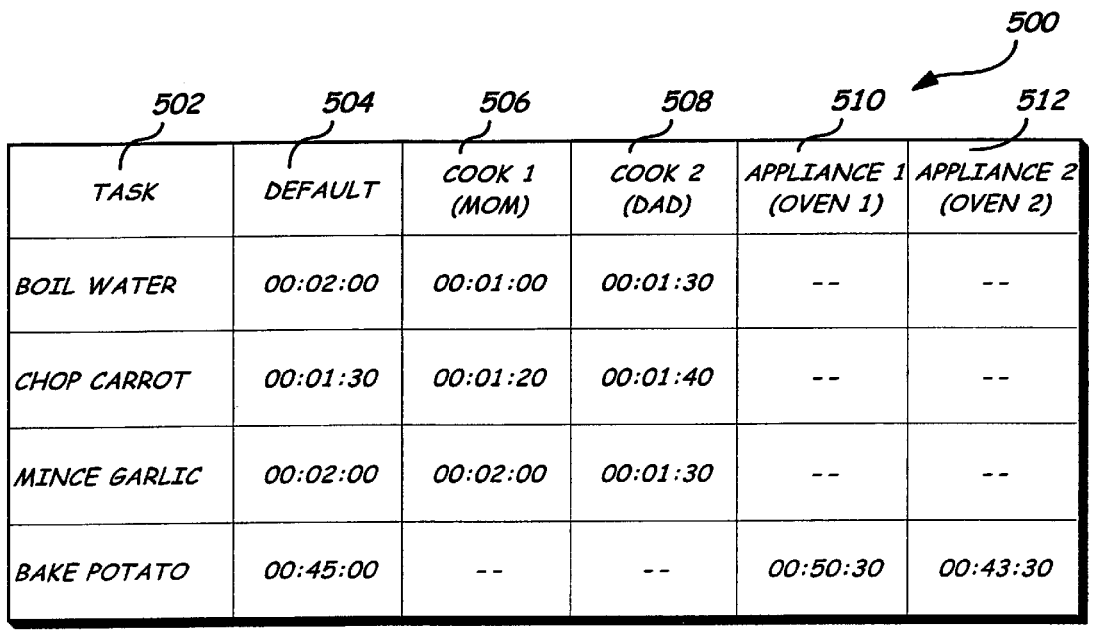
FIG. 5 is a table illustrating an exemplary task database structure suitable for use in merging tasks of two or more recipes, such as the recipes illustrated in FIG. 2.

Referring now to FIG. 5, an exemplary task database 500 capable of providing both default and measured time requirements with an exemplary embodiment of the present invention is shown. The task database 500 includes one or more tasks 502 that may be initially associated with a generic estimated or default time requirement 504 describing the estimated time required by an average cook to complete that task 502. These default time requirements 504 may be used, for example, by the system until actual or measured time requirements 506, 508, 510 & 512 for the tasks 502 can be ascertained and stored in the database 500. Similarly, default time requirements 504 may be used when a cook that is not known to the system performs the task. Further, the system may be capable of reverting to the default time requirements 504 should use of the measured time requirements become undesirable.

Tasks 502 may likewise be associated with the actual or measured time requirements for specific cooks, in this example, "MOM" and "DAD" 506 & 508. Such time requirements 506 & 508 may be determined by measuring the actual time taken for the cooks to perform the task, as described herein in the discussion of FIGS. 1, 4A and 4B. Similarly, estimated or default time requirements 504 and/or actual or measured time requirements 510 & 512 may be associated with resources or appliances used to perform tasks 502. Thus, as shown in FIG. 5, for the task "BAKE POTATO", a default time requirement 504 (e.g., "00:45:00") may be stored in the task database 500 for use when the particular appliance (in this case an oven) being used is not known. However, where the appliance used to perform the task is known, actual or measured time requirements for the appliance may be stored. Thus, in the exemplary task database 500 of FIG. 5, appliances "OVEN 1" and "OVEN 2" are shown as having actual or measured time requirements associated with the task "BAKE POTATO" of "00:50:30" and "00:43:30", respectively.

In a similar manner, the type and amount of resources required for performing tasks may be updated, for example, by requesting the cook input the actual resources used for performing the task if different than the resources the cook was instructed to use. Referring again to FIG. 1, as the tasks are completed, at step 106, the actual resources required to perform a task may be measured or determined at step 108 and used for updating the resource requirement 110 associated with the task at step 108, for example by updating the task database 214 shown in FIG. 2. For example, the amount and type of resources used to perform a task may be determined by placing the system implementing the present invention in a "learning mode" wherein the resources required for performing tasks are recorded. The system may revert to a "normal" mode wherein the amounts and types of resources used are no longer recorded. Alternately, the resources used by a cook to complete a given task may be recorded each time that task is performed. In this manner, a feedback loop may be provided to ensure that resource requirements associated with tasks in the task database are as accurate as possible.

Figure 6:
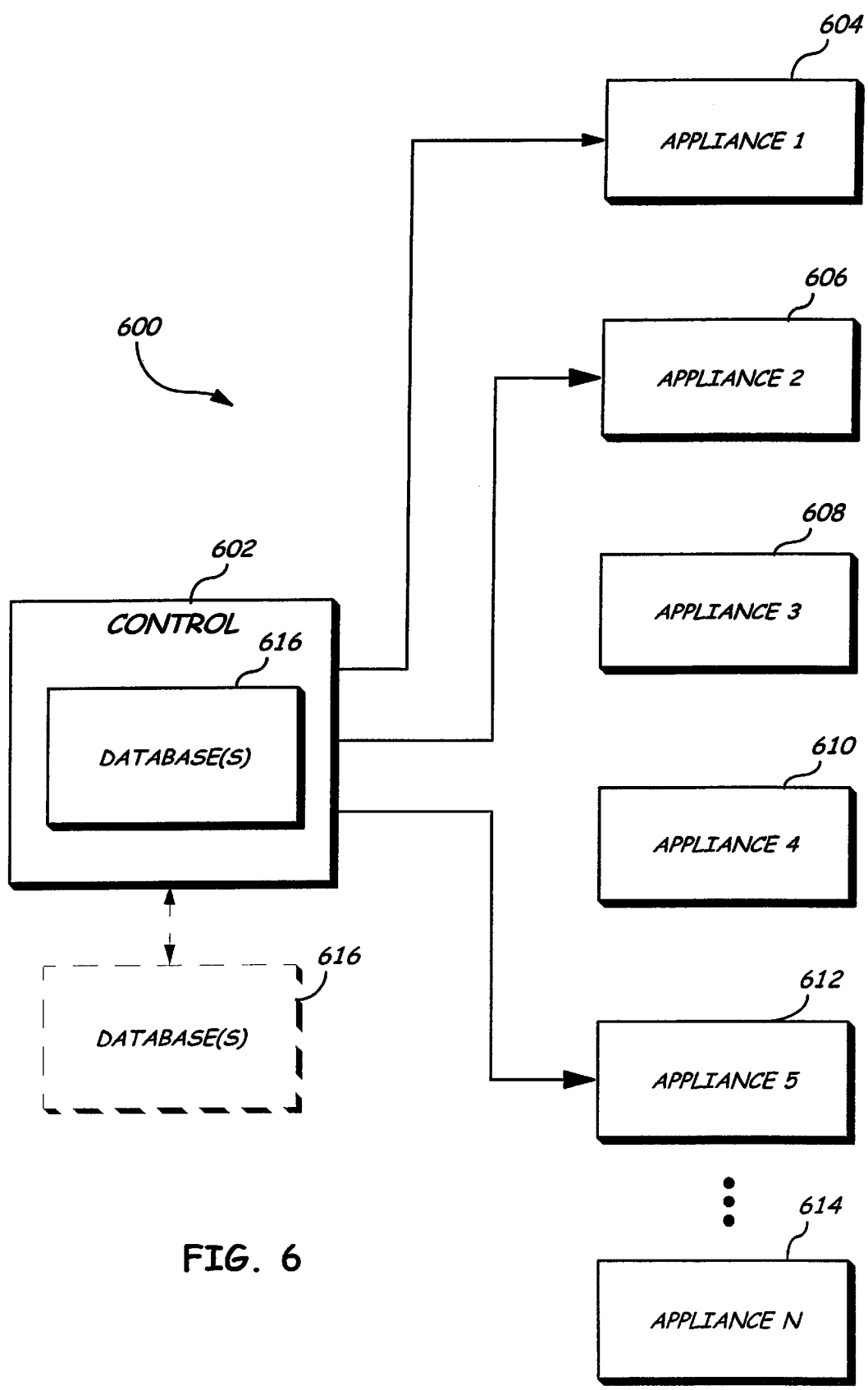
FIG. 6 is a block diagram illustrating a system in accordance with an exemplary embodiment of the present invention.

Referring now to FIG. 6, an exemplary system 600 capable of implementing the electronic recipe manager of the present invention is described. The system 600 includes a control appliance ("CONTROL") 602 and one or more and up to N cooking appliances 604–614, such as stoves, ovens, microwaves, refrigerators, mixers, and the like. One or more of the cooking appliances, for example, "APPLIANCE 1" 604, "APPLIANCE 2" 606, and "APPLIANCE 5" 612 may be automated so as to be directly controlled by the control appliance 602 without intervention by a cook. Alternately, appliances within the system 600, for example, "APPLIANCE 3" 608, "APPLIANCE 4" 610 and "APPLIANCE N" 614, may be manually controlled by cooks using the system 600 in a conventional manner.

In exemplary embodiments of the invention, the control appliance 602 may interrogate one or more databases 616 such as a recipe database, task database and resource database for retrieving electronic recipes and time and resource requirements and availability as described in the discussion of FIG. 2. These database(s) 616 may be stored in the control appliance's internal memory, or alternately accessed from a remote source via a network such as the Internet, an Intranet or the like.

Figure 7:
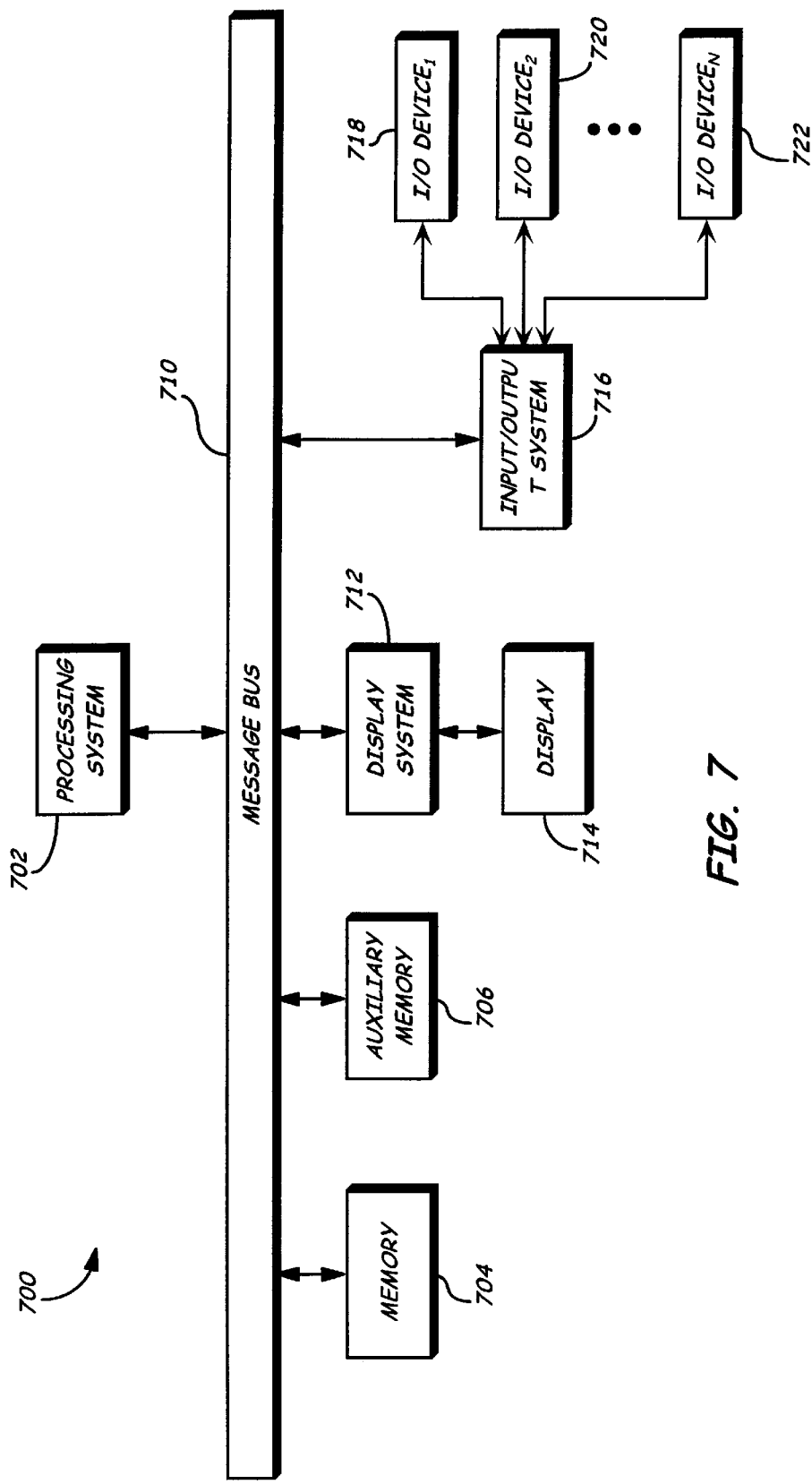
FIG. 7 is a block diagram illustrating an exemplary information appliance suitable for implementation of the system and method of the present invention.

The present invention may be implemented as programs of instructions resident in the memory of one or more information appliances configured generally as described in FIG. 7. Such an information appliance may for example function as the control appliance 602 of the system 600 shown in FIG. 6. Until required by the information appliance, the set of instructions may be stored in another readable memory device, for example in a hard disk drive or in a removable memory such as an optical disk for utilization in a CDROM drive or a DVD drive, a floppy disk for utilization in a floppy disk drive, a personal computer memory card for utilization in a personal computer card slot, or the like. Further, the program of instructions can be stored in the memory of another information appliance and transmitted over a local area network or a wide area network, such as the Internet, an Intranet, or the like, when desired by the user. Additionally, the instructions may be transmitted over a network in the form of an applet that is interpreted or compiled after transmission to the information appliance rather than prior to transmission. One skilled in the art would appreciate that the physical storage of the sets of instructions or applets physically changes the medium upon which it is stored electrically, magnetically, chemically, physically, optically or holographically so that the medium carries computer readable information.

Referring now to FIG. 7, a hardware system in accordance with the present invention is shown. The hardware system 700 shown in FIG. 7 is generally representative of the hardware architecture of an information appliance suitable for implementing the present invention. In one embodiment, the hardware system 700 may comprise a convergence system, PC/TV system or the like, so named because such systems represent the convergence of computer and consumer electronics into a single system. Alternately, the hardware system, or portions thereof, may be part of an information appliance providing a specific media. Examples of such appliances include televisions, VCR devices, DVD devices, Web TV devices, satellite receivers, cable boxes and the like.

The hardware system 700 is controlled by a central processing system 702. The central processing system 702 includes a central processing unit such as a microprocessor or microcontroller for executing programs, performing data manipulations and controlling the tasks of the hardware system 700. Communication with the central processor 702 is implemented through a system bus 710 for transferring information among the components of the hardware system 700. The bus 710 may include a data channel for facilitating information transfer between storage and other peripheral components of the hardware system. The bus 710 further provides the set of signals required for communication with the central processing system 702 including a data bus, address bus, and control bus. The bus 710 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 700 include main memory 704, and auxiliary memory 706. The hardware system 700 may further include an auxiliary processing system (not shown) as required. The main memory 704 provides storage of instructions and data for programs executing on the central processing system 702. The main memory 704 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and so on. The auxiliary memory 706 provides storage of instructions and data that are loaded into the main memory 704 before execution. The auxiliary memory 706 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 706 may also include a variety of non-semiconductor-based memories, including but not limited to magnetic tape, drum, floppy disk, hard disk, optical, laser disk, compact disc read-only memory (CDROM), write once compact disc (CDR), rewritable compact disc (CDRW), digital versatile disc read-only memory (DVD-ROM), write once DVD (DVD-R), rewritable digital versatile disc (DVD-RAM), etc. Other varieties of memory devices are contemplated as well. The hardware system 700 may optionally include an auxiliary processing system (not shown) which may be an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 700 further includes a display system 712 for connecting to a display device 714, and an input/output (I/O) system 716 for connecting to one or more I/O devices 718, 720, and up to N number of I/O devices 722. The display system 712 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like. The display device 714 may comprise a cathode ray-tube (CRT) type display such as a monitor or television, or may comprise an alternative type of display technology such as a projection-type CRT display, a liquid-crystal display (LCD) overhead projector display, an LCD display, a light-emitting diode (LED) display, a gas or plasma display, an electroluminescent display, a vacuum fluorescent display, a cathodoluminescent (field emission) display, a plasma-addressed liquid crystal (PALC) display, a high gain emissive display (HGED), and so forth. The input/output system 716 may comprise one or more controllers or adapters for providing interface functions between the one or more I/O devices 718–722. For example, the input/output system 716 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CDROM), digital versatile disc (DVD), video capture device, TV tuner card, touch screen, stylus, electroacoustic transducer, microphone, speaker, audio amplifier, etc. The input/output system 716 and I/O devices 718–722 may provide or receive analog or digital signals for communication between the hardware system 700 of the present invention and external devices, networks, or information sources. The input/output system 716 and I/O devices 718–722 preferably implement industry promulgated architecture standards, including Ethernet IEEE 802 standards (e.g., IEEE 802.3 for broadband and baseband networks, IEEE 802.3 z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 700 of FIG. 7 by one having ordinary skill in the art would not depart from the scope or the spirit of the present invention.

In exemplary embodiments, the methods disclosed may be implemented as sets of instructions such as software or firmware readable by an information appliance as described in the discussion of FIG. 7. It is understood that the specific order or hierarchies of steps in the methods disclosed are examples of exemplary approaches. Based upon design preferences, it is understood that the specific order or hierarchy of steps in the method can be rearranged while remaining within the scope of the present invention. The attached method claims present elements of the various steps in a sample order, and are not meant to be limited to the specific order or hierarchy presented.

It is believed that the system and method of the present invention and many of their attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for preparing two or more food items, comprising:

retrieving in a computer system at least a first recipe for preparing a first food item and a second recipe for preparing a second food item, each of the first and second recipes including at least one task; and merging the first recipe and the second recipe by combining the at least one task of the first recipe and the at least one task of the second recipe to provide a task list suitable for use in preparing the first and second food items; and identifying a cook performing the task from the plurality of cooks; and associating an actual time required to complete the task with the identity of the cook for providing a time requirement for performing the task for the identified cook;

wherein the time requirement for performing the task for the identified cook is thereafter used for arranging the task in the task list when that cook is to perform the task and wherein the tasks within the task list are arranged chronologically so that the first food item and the second food item are completed at substantially the same time.

2. The method as claimed in claim 1, wherein merging the first recipe and the second recipe includes interrogating a database associating each task with a time requirement describing the estimated time required for performing the task, wherein the time requirement is used for arranging the task in the task list.

3. The method as claimed in claim 1, further comprising, whereupon a task is performed, determining the actual time required for performing the task, whereupon the actual time required for performing the task is used for updating the time requirement associated with the task.

4. The method as claimed in claim 1, wherein merging the first recipe and the second recipe includes interrogating a database associating each task with an appliance requirement describing the appliance required for performing the task, wherein the appliance requirement is used for arranging the task in the task list.

5. The method as claimed in claim 1, wherein merging the first recipe and the second recipe includes interrogating a database capable of associating each task with a time requirement and an appliance requirement describing respectively the time and appliance required for performing the task, wherein the time requirement and the appliance requirement are used for arranging the task in the task list.

6. The method as claimed in claim 5, further comprising, whereupon a task is performed, determining the actual time required for performing the task, whereupon the actual time required for performing the task is used for updating the time requirement associated with the task.

7. The method as claimed in claim 6, further comprising:
   identifying a cook performing the task from a plurality of cooks; and
   associating an actual time required to complete the task with the identity of the cook for providing a time requirement for performing the task for the identified cook;
   wherein the time requirement for performing the task for the identified cook is thereafter used for arranging the task in the task list when that cook is to perform the task.

8. A system for preparing two or more food items, comprising:
   means for retrieving in a computer system at least a first recipe for preparing a first food item and a second recipe for preparing a second food item, each of the first and second recipes including at least one task; and
   means for merging the first recipe and the second recipe by combining the at least one task of the first recipe and the at least one t of the second recipe to provide a task list suitable for use in preparing the first and second food items; and
   means for determining the actual time required for performing the task; and
   means for identifying a cook from the plurality of cooks performing the task; and
   means for associating an actual time required to complete the task with the identity of the cook for providing a time requirement for performing the task for the identified cook;
   wherein the tasks are arranged chronologically so that the f food item and the second food item are completed at substantially the same time and wherein the means for merging includes means for interrogating a database associating each task with a time requirement describing the estimated time required for performing the task and whereupon the actual time required for performing the task is used for updating the time requirement associated with the task and wherein the time requirement for performing the task for the identified cook is thereafter used for arranging the task in the task list when that cook is to perform the task.

9. A system for preparing two or more food items, comprising:
   means for retrieving in a computer system at least a first recipe for preparing a first food item and a second recipe for preparing a second food item, each of the first and second recipes including at least one task; and
   means for merging the first recipe and the second recipe by combining the at least one task of the first recipe and the at least one task of the second recipe to provide a task list suitable for use in preparing the first and second food items; and
   means for assigning the tasks within list to a plurality of cooks;
   means for identifying a cook performing the task; and
   means for associating an actual time required to complete the task with the identity of the cook for providing a time requirement for performing the task for the identified cook;
   wherein the time requirement for performing the task for the identified cook is thereafter used for arranging the task m the task list when that cook is to perform the task and wherein the tasks are arranged chronologically so that the first food item and the second food item are completed at substantially the same time and wherein the means for merging the first recipe and the second recipe includes means for interrogating a database capable of associating each task with a time requirement and an appliance requirement describing respectively the time and appliances required for performing the task and wherein the time requirement and the appliances requirement are used for arranging the task in the task list and whereupon a task is performed, for determining the actual time required for performing the task, whereupon the actual dine required for performing the task is used for updating the time requirement associated with the task.

* * * * *